July 19, 1960 K. J. KNUDSEN 2,946,007
ELECTRICAL INSTRUMENT
Original Filed July 17, 1951

Inventor
Knud J. Knudsen
By
Johnson and Kline
Attorneys

United States Patent Office 2,946,007
Patented July 19, 1960

2,946,007
ELECTRICAL INSTRUMENT

Knud J. Knudsen, Woodbury, Conn., assignor to The Lewis Engineering Company, Naugatuck, Conn., a corporation of Connecticut Original application July 17, 1951, Ser. No. 237,120, now Patent No. 2,802,988, dated Aug. 13, 1957. Divided and this application May 21, 1957, Ser. No. 660,520

2 Claims. (Cl. 324—154)

The present invention relates to an electrical instrument and more particularly to a mechanism for causing the instrument indicator to be forced to a non-indicating position upon de-energizing of the meter.

The present invention is a division of applicant's copending application, Serial No. 237,120, filed July 17, 1951, and entitled "Large-Deflection Electrical Instrument" and now U. S. Patent No. 2,802,988, granted August 13, 1957.

The instrument of the present invention is of the type commonly referred to as a ratio meter. In such a meter there are at least two coils operating in their own magnetic fields. The coils are preferably mounted on a common shaft which also carrier the indicator so that upon energization of the coils, they tend to rotate the shaft and hence the indicator. One of the coils is called a deflecting coil and operates to cause deflection of the indicator. Instead of having mechanical restraining devices to oppose the action of the deflecting coil, the other coil is utilized which is called a restoring coil and it functions to exert a force on the shaft to maintain the shaft stationary at one angular position. Accordingly upon de-energization of ths coils there are no devices which will move the indicator to an off-scale or a non-indicating position and thus an observer noticing the indicator positioned on the scale, would naturally assume that the instrument is energized.

It is accordingly an object of the present invention to provide in an electrical meter of the type wherein the indicator means is not normally urged to off-scale position, improved restoring or sweep-off means for clearing the pointer from the scale to a non-indicating position during periods when the instrument is not in use.

Another object of the present invention is to provide in a multi-coil large deflection meter of the type which has a scale of almost three right angles and a coextensive path of movement of the indicator for a restoring mechanism to force the indicator to a position in which there are no scale quantities upon de-energization of the meter.

In attaining the above objects, the restoring mechanism includes a spring which exerts a force for urging the indicator to the off-scale position. However, when the meter is energized the force of the spring is overcome by a force created by a solenoid which permits freedom of movement of the indicator over its entire path. The solenoid acts on a pivoted armature which has an arcuate rack and through a small gear enables the restoring mechanism to permit movement of the indicator from its non-indicator position to its maximum indicating position, a path of travel of approximately 300°.

Other features and advantages will hereinafter appear.

Referring to the drawing.

Figure 1:
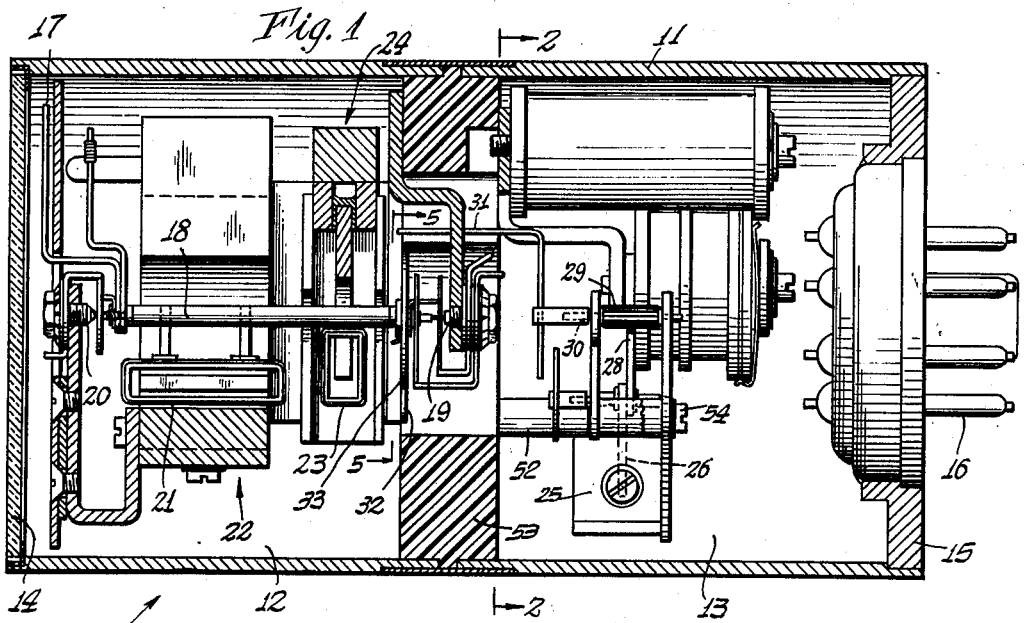
Figure 1 is an axial sectional view of a ratio meter made in accordance with the instant invention.

Referring to Fig. 1, the ratio meter in which the restoring means of the present invention is incorporated is generally indicated by the reference numeral 10 and has a cylindrical casing 11 divided into front and rear portions 12 and 13. The front of the meter has a transparent window 14 and the rear wall thereof 15, has electrical terminals 16. Mounted in the front portion 12 is an indicator 17 attached to a shaft 18 which is mounted on pivots 19 and 20. The shaft 18 carries a deflecting coil 21 operable in a permanent magnetic field structure indicated generally by reference numeral 22. Also connected to the shaft 18 is a restoring coil 23 similarly operable in a permanent magnetic field structure 24. The coils and magnetic field structure cooperate in a manner set forth in my above mentioned parent application. As also recited therein, the indicator of the present instrument is capable of a large deflection of at least two right angles and substantially approximately three right angles by the coils 21 and 23.

It will be appreciated that the restoring coil tends to exert a force which normally maintains the indicator in one angular position. The deflecting coil serves to actuate the shaft away from the angular position to provide for deflection of the indicator. Thus there are no mechanical or electrical devices which upon de-energization of the meter cause the indicator to assume a non-indicating position (as shown in Fig. 3) since the indicator would normally tend to remain in its last position when the coils are de-energized.

Figure 2:
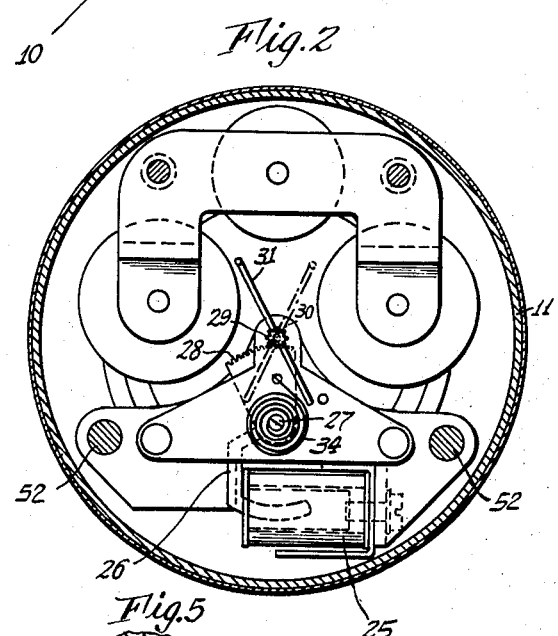
Fig. 2 is a transverse sectional view taken on the line 2—2 of Fig. 1.
Figure 3:
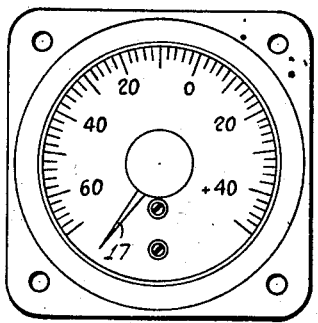
Fig. 3 is a front or face view of the instrument showing the indicator and scale.
Figure 5:
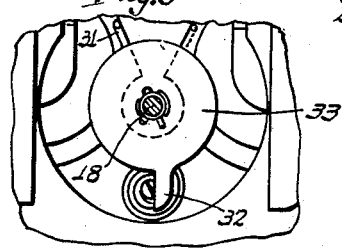
Fig. 5 is a detail taken on the line 5—5 of Fig. 1.

In accordance with the present invention novel improved restoring means are provided for shifting the indicator 17 off the scale to the position shown in Fig. 3 whenever the instrument movement is not energized or in use. As shown in Figs. 1 and 2, this sweep-off means comprises a solenoid coil 25 having an arcuate armature 26 mounted on a shaft 27, which armature carries a gear segment or arcuate rack 28. The segment 28 meshes with a pinion 29 on a shaft 30, the latter carrying an angular sweep-off arm 31 adapted to engage a projecting finger 32 on a disk 33 carried by the shaft 18. The sweep-off arm 31 is movable through an arc greater than three right angles, from the position shown in Figs. 2 and 5 in full lines counterclockwise to the dotted line position shown therein. During such movement, the arm will engage the finger 32 and turn the disk 33 counterclockwise, Fig. 2, to place the finger in the dotted line position indicated wherein the pointer will be held in the off-scale position shown in Fig. 3.

The shaft 27 has a spiral coil spring 34 which is strong enough to move the sweep-off arm 31 counterclockwise from its full line position of Fig. 2 to the dotted line position and to carry with it the movable coil system of the instrument movement, against any opposition of the instrument movement. Whenever the solenoid coil 25 is energized, however, it will pull the armature to the position shown in Fig. 2, overcoming the action of the spring 34 and swinging the sweep-off arm clockwise from the dotted line position to the full line position of Fig. 2.

Figure 4:
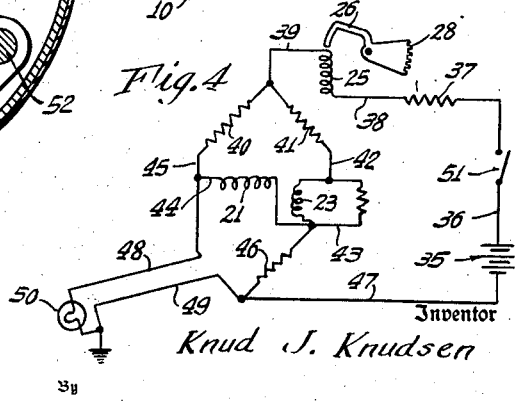
Fig. 4 is a schematic diagram showing a temperature measuring bridge circuit which includes the coils of the meter.

Referring to Fig. 4, the solenoid 25 is connected in circuit with the deflecting and restoring coils 21 and 23 of the instrument movement so as to be energized whenever the instrument movement is energized. In Fig. 4, a battery 35 or other source of current is connected by a wire 36 through a current-limiting resistor 37 and wire 38 to the solenoid 25. The solenoid 25 is in turn connected by a wire 39 to bridge resistors 40 and 41, the latter being connected through a wire 42 to the restoring coil 23. This coil is connected by a wire 43 to the deflecting coil 21 which is connected by wires 44 and 45 to the resistor 40. A bridge resistor 46 is connected to the wire 43 and to a wire 47 leading to the battery 35. The wires 44 and 47 are connected by wires 48 and 49 respectively to the two ends of a resistance thermometer bulb 50. An on-off switch 51 is interposed in the wire 36, and it will be understood that whenever the switch 51 is open the solenoid 25 will be de-energized and the restoring system made operative to maintain the indicator 17 in the position of Fig. 3. Whenever the switch 51 is closed, the solenoid 25 will be energized, shifting the sweep-off arm 31 to the full line position shown in Fig. 2, whereupon the movable coil system of the instrument will be energized and free to assume whatever position is dictated by the current flowing in the deflecting and restoring coils.

It will be apparent that a sweep-off system as described above is simple, effective and reliable in its operation. Moreover, it may be constructed to constitute a unit complete and separate from the instrument movement, being practically wholly contained in the casing 11 as shown in Figs. 1 and 2. The sweep-off mechanism is carried on posts 52 secured to a supporting wall 53, and is held in place by screws 54, and obviously it may be removed and serviced and then replaced independently of the instrument movement, and vice versa.

Variations and modifications may be made within the scope of the claims and portions of the improvements may be used without others.

I claim:

1. A large deflection electrical instrument comprising a shaft, a pair of coils on said shaft, a magnetic field structure for each coil, an indicator connected to the shaft, and energizing means for the coils, whereby upon variation in the energization of the coils the indicator is caused to move thereby and upon deenergization of the coils the indicator remains stationary in its last position; and means for causing the indicator to be moved to a non-indicating position, said means including a projection carried by the shaft, a link mounted on a pivot for pivotal movement and engageable with the projection for rotating the shaft, a gear carried by the pivot and connected to the link, an armature pivoted intermediate its length and having one end portion formed as a gear segment for engagement with the gear, the other end portion being formed as an arm, spring means connected to the armature for forcing the armature in one direction; a solenoid for magnetically attracting the arm of the armature to pivot the armature against the action of the spring and cause over a two right angle movement of the link from one end position to its other, whereby the solenoid when energized moves the link to one end position to permit freedom of movement of the shaft and the spring upon de-energization of the solenoid, causes the link to move to its other end position which moves the indicator to a non-indicating position.

2. A large deflection electrical instrument comprising a shaft, a pair of coils on said shaft, a magnetic field structure for each coil, an indicator connected to the shaft and energizing means for the coils, whereby upon variation in the energization of the coils the indicator is caused to move thereby and upon de-energization of the coils the indicator remains stationary in its last position; and means for causing the indicator to be moved to a non-indicating position, said means including a projection carried by the shaft, a link mounted on a pivot for pivotal movement and engageable with the projection for rotating the shaft, a gear carried by the pivot and connected to the link, an armature pivoted intermediate its length and having one end portion formed as a gear segment for engagement with the gear, the other end portion being formed as an arm, spring means connected to the armature for forcing the armature in one direction; a solenoid for magnetically attracting the arm of the armature to pivot the armature against the action of the spring and cause over a two right angle movement of the link from one end position to its other; a connection for electrically positioning the solenoid in series with the two coils and a switch in said connection for causing de-energization of the coils and also the solenoid to permit the spring to force the link and the shaft from its last position to the non-indicating position.

References Cited in the file of this patent

UNITED STATES PATENTS

| | | |
|---|---|---|
| 722,030 | Merz | Mar. 3, 1903 |
| 2,042,601 | Holtz | June 2, 1936 |
| 2,382,295 | Conrad | Aug. 14, 1945 |
| 2,419,612 | Warshaw | Apr. 29, 1947 |
| 2,428,229 | Kelly | Sept. 30, 1947 |
| 2,515,375 | Kelly | July 18, 1950 |
| 2,586,831 | Knudsen | Feb. 26, 1952 |